(12) United States Patent
Raab et al.

(10) Patent No.: US 8,707,688 B2
(45) Date of Patent: Apr. 29, 2014

(54) COMMERCIAL VEHICLE WITH AN INTERNAL COMBUSTION ENGINE AND A HEAT RECOVERY SYSTEM USING THE HEAT SOURCES OF THAT ENGINE

(75) Inventors: Gottfried Raab, Perg (AT); Markus Raup, Attnang-Puchheim (AT); Josef Klammer, Lienz (AT)

(73) Assignee: MAN Nutzfahrzeuge Öesterreich AG, Steyr (AT)

( * ) Notice: Subject to any disclaimer, the term of this patent is extended or adjusted under 35 U.S.C. 154(b) by 675 days.

(21) Appl. No.: 12/423,149

(22) Filed: Apr. 14, 2009

(65) Prior Publication Data
US 2009/0255243 A1 Oct. 15, 2009

(30) Foreign Application Priority Data
Apr. 14, 2008 (AT) .................................. A 576/2008

(51) Int. Cl.
*F01N 3/02* (2006.01)
(52) U.S. Cl.
USPC ............................................. 60/320; 60/604
(58) Field of Classification Search
USPC .................................... 60/320, 321, 604, 620
See application file for complete search history.

(56) References Cited

U.S. PATENT DOCUMENTS

| | | | | |
|---|---|---|---|---|
| 3,280,903 A * | 10/1966 | Stoddard, Jr. | ................. | 165/135 |
| 3,501,095 A * | 3/1970 | Peterson | .................. | 237/12.3 R |
| 3,748,830 A * | 7/1973 | Ross et al. | ..................... | 95/195 |
| 4,426,844 A * | 1/1984 | Nakano | .......................... | 60/295 |
| 6,871,489 B2 * | 3/2005 | Tumati et al. | .................. | 60/285 |
| 7,063,134 B2 * | 6/2006 | Poole et al. | ..................... | 165/163 |
| 2003/0064271 A1 * | 4/2003 | Stenersen | ....................... | 429/34 |
| 2003/0145583 A1 * | 8/2003 | Tanaka et al. | .................. | 60/298 |
| 2005/0284691 A1 * | 12/2005 | Voss et al. | ..................... | 181/255 |
| 2010/0146949 A1 * | 6/2010 | Stobart et al. | .................. | 60/300 |

\* cited by examiner

*Primary Examiner* — Kenneth Bomberg
*Assistant Examiner* — Jonathan Matthias
(74) *Attorney, Agent, or Firm* — Conzen O'Connor (57) ABSTRACT

In a commercial vehicle with an internal combustion engine, a muffler in the exhaust gas system, and a heat recovery system, including a medium-containing circuit having at least one pump, an evaporator, an expander, and a condenser, the evaporator present in the medium-containing circuit of the heat recovery system is placed so that the evaporator is integrated into the muffler, where it either is installed in the tailpipe or partially replaces it, or is attached externally to the muffler, and an end section of the tailpipe, or is integrated into the tailpipe, which extends from the muffler and proceeds vertically upward behind the driver's cab, the evaporator being either installed in the tailpipe or partially replacing it, or is integrated into a muffler, which is installed in an exhaust pipe proceeding vertically upward behind the driver's cab.

9 Claims, 15 Drawing Sheets

COMMERCIAL VEHICLE WITH AN INTERNAL COMBUSTION ENGINE AND A HEAT RECOVERY SYSTEM USING THE HEAT SOURCES OF THAT ENGINE

BACKGROUND OF THE INVENTION

1. Field of the Invention

The present invention pertains to a commercial vehicle, especially a truck, with an internal combustion engine and a heat recovery system, the medium-containing circuit of which includes at least one pump, an evaporator, an expander and a condenser.

2. Description of the Related Art

In the case of commercial vehicles, especially trucks, the use of ever more powerful internal combustion engines has caused increasing problems with proper cooling. Cooling has become very difficult, because the required radiators must have very large volumes, which are by now almost too large to be installed in the vehicle. Various proposals have already been offered for avoiding such large radiators, and all of them are based on the idea of using the cooling water to carry away the heat of the engine in a manner different from that of conventional cooling. A known method of this type involves the recovery of heat from the heat sources of the engine, where the heat is extracted from the heat sources such as the cooling water or hot engine assemblies and then put to some useful purpose. At least one pump, an evaporator, an expander, and a condenser are provided in the associated circuit through which the medium flows. All these additional units take up a certain amount of space in the vehicle.

SUMMARY OF THE INVENTION

It is an object of the present invention to find a space-saving way to accommodate the evaporator despite the limited amount of space available in a commercial vehicle.

This object is achieved according to the present invention by the manner in which the evaporator is designed and accommodated in the commercial vehicle of the general type, especially a truck, with an internal combustion engine, a muffler and exhaust pipe in the exhaust system, and a heat recovery system with a medium-containing circuit including at least one pump, an evaporator, an expander and a condenser.

Because of the way in which the evaporator is accommodated in or on a muffler or exhaust pipe, it is ensured that there is no interference with the accommodation of other vehicle components. In addition, an evaporator accommodated in the way proposed by the present invention makes it possible to make optimal use of the residual heat of the exhaust gas to convert a circulating liquid medium into its vapor state, which vapor can then be supplied to an expander. The expander then converts the energy of the vapor into mechanical energy, which can be transmitted to the internal combustion engine and thus increase its power output.

A heat recovery system of this type also offers the advantage that, to the extent that use can also be made of other heat sources of the internal combustion engine such as the cooling water and/or recycled exhaust gas, the amount of heat which even powerful internal combustion engines generate can be kept within bounds and thus also the necessary cooling capacity of the radiator and its size can be limited.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PRESENTLY PREFERRED EMBODIMENTS

Each of FIGS. 1, 4, 7, 9, and 11 shows a tractor unit. The commercial vehicle 1 comprises a chassis 2 and a driver's cab 3 mounted on top of it. Underneath the driver's cab 3 is an internal combustion engine 4, which acts on the drive wheels 6 of the commercial vehicle 1 by way of a drive train 5 comprising a clutch and a manual transmission or an automatic transmission. A heat recovery system is connected to the internal combustion engine 4 to exploit its heat sources. Only the parts of this heat recovery system which are associated with the present invention will be explained in greater detail. The internal combustion engine 4 preferably comprises a cooled exhaust gas recycling system and a one-stage or multi-stage exhaust gas turbocharger. A muffler 8 is installed in the exhaust gas system 7 of the internal combustion engine 4. As part of the heat recovery system, a medium-containing circuit is operatively connected to the internal combustion engine 4. In this heat recovery circuit, the waste heat of the internal combustion engine 4 and/or of hot engine assemblies such as exhaust gas return line(s), turbochargers, etc, and of working media such as cooling water, charging air, exhaust gas, etc, can be converted by suitable devices into useful, power-boosting energy. At least one pump, an evaporator, an expander, and a condenser are provided in the medium-containing circuit. The present invention pertains to the location and to the manner of accommodating the evaporator 9 and to the design of the elements which receive or accommodate the same. There are various possibilities for achieving these objectives. In a first version—as shown in the embodiment according to FIGS. 1-3—the evaporator 9 is integrated into the muffler 8. The evaporator 9 is either installed in the tailpipe 10 or partially replaces the tailpipe 10. In a second version—as shown in the exemplary embodiment according to FIGS. 4-6—the evaporator 9 is attached externally to the muffler 8, toward the bottom and to the side, and the final section 10*b* of the tailpipe 10 proceeds from the evaporator 9. In a third version—as shown in the exemplary embodiment according to FIGS. 7 and 8—the evaporator 9 is also attached externally to the muffler 8, but here the evaporator is placed on top of the muffler. Here, too, the vertically upward-pointing final section 10*b* of the tailpipe 10 proceeds from the evaporator 9. In a fourth version—as shown in the exemplary embodiment according to FIGS. 9 and 10—the evaporator 9 is either installed in the tailpipe 10 which proceeds from the muffler 8 and extends upward behind the driver's cab 3, or it partially replaces the tailpipe 10. In a fifth version—as shown in the exemplary embodiment according to FIGS. 11 and 12—the evaporator 9 is integrated into a muffler 8 installed in an exhaust pipe 28, which extends vertically upward behind the driver's cab 3.

Details of these inventive evaporator arrangements are described in greater detail below.

Figure 1:
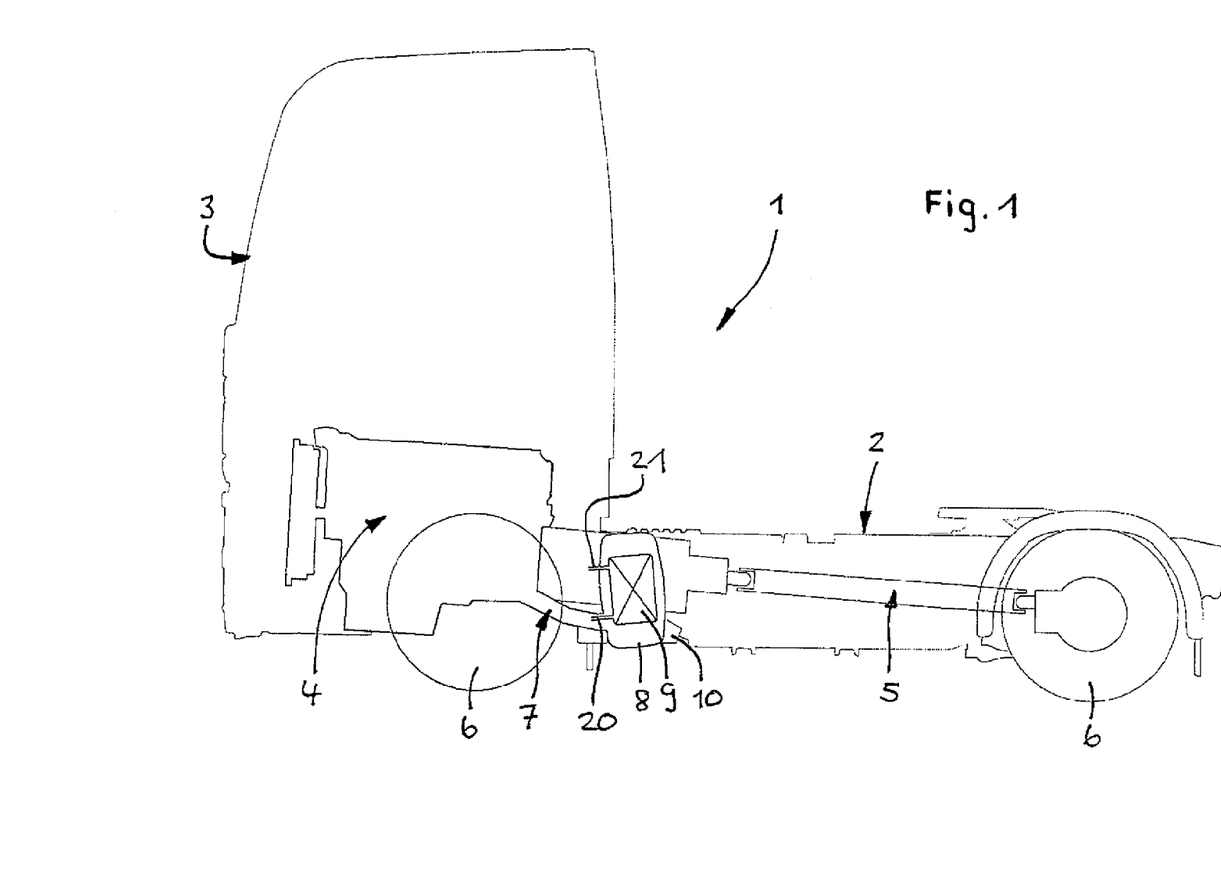
FIG. 1 shows a schematic diagram of a tractor unit with a muffler and integrated evaporator.
Figure 2:
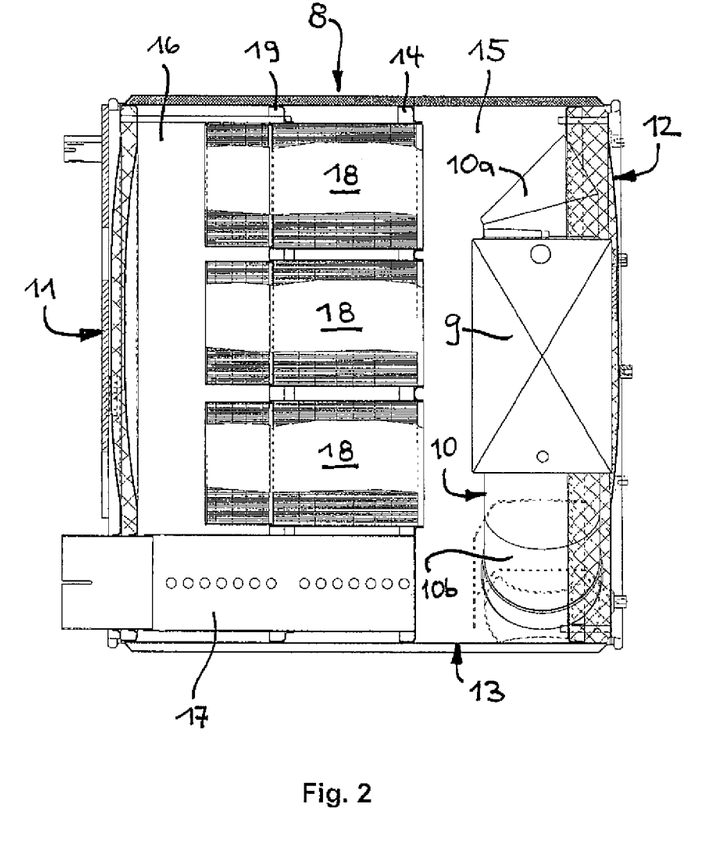
FIG. 2 shows a longitudinal cross section through an embodiment of a muffler like that used in the vehicle according to FIG. 1.
Figure 3:
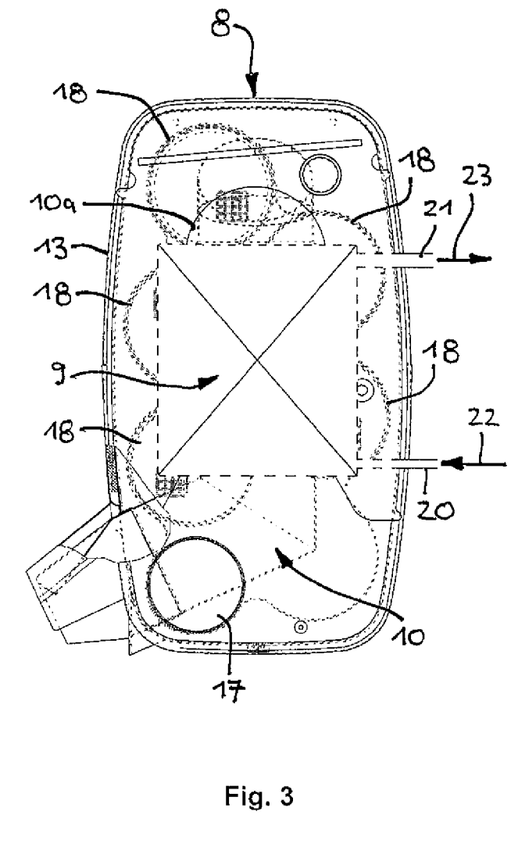
FIG. 3 shows a cross section of the muffler of FIG. 2.

The muffler 8, which is installed in the commercial vehicle 1 according to FIG. 1 adjacent to the internal combustion engine 4 and which is attached to the frame of the chassis 2, can be realized in the way shown in FIGS. 2 and 3. This muffler 8 is designed in the form of a drum and comprises a front-end wall 11 and a rear-end wall 12; a hollow cylindrical circumferential outside wall 13, which connects both walls 11, 12 together; an intake space 16, separated from an exhaust space 15 by an intermediate wall 14; an intake pipe 17 leading to the intake space 16; and a tailpipe 10. The inlet section 10*a* of the tailpipe 10 is arranged in the exhaust space 15; and, in the area of the terminal wall 12, which forms one of the boundaries of the exhaust space 15, the outlet section 10*b* of the tailpipe is guided out of the muffler 8 downstream from the evaporator 9 either through this wall or through the circumferential outside wall 13. The evaporator 9 is either installed in the inlet section 10*a* of the tailpipe 10 or the evaporator 9 replaces a part of the tailpipe 10 between its inlet section 10*a* and the outlet section 10*b*. In the latter case, the evaporator 9 is attached to wall 12 of the muffler 8. Several exhaust gas post-treatment modules 18 are also provided in the muffler 8 shown here, furthermore, where they are held in place by the gas-tight intermediate wall 14 and by a gas-permeable support wall 19 a certain distance away from the intermediate wall. Each of these exhaust gas post-treatment modules 18 contains, for example, a particle separator or filter and/or at least one catalyst, each installed in a housing. As can be seen in FIGS. 2 and 3, the evaporator 9 in this embodiment is attached to the inside surface of the end wall 12 of the muffler 8, which forms one of the boundaries of the exhaust space 15.

A connection piece 20 for supplying a circulating liquid medium is provided at the bottom of the evaporator 9, and a connection piece 21 for discharging of the circulating medium which has been converted into its vapor state is provided at the top. The two connection pieces 20, 21 proceeding from the evaporator 9 are guided out of the muffler 8 through the adjacent wall 12 or through the adjacent area of the circumferential outside wall 13 of the muffler 8, and are connected externally to a feed line, symbolized by an arrow 22, for the circulating liquid medium and to a discharge line, symbolized by the arrow 23, for the circulating vapor medium. In FIG. 1, the position of the evaporator 9 on the commercial vehicle 1 is indicated by a black field in the area of the muffler 8.

Figure 4:
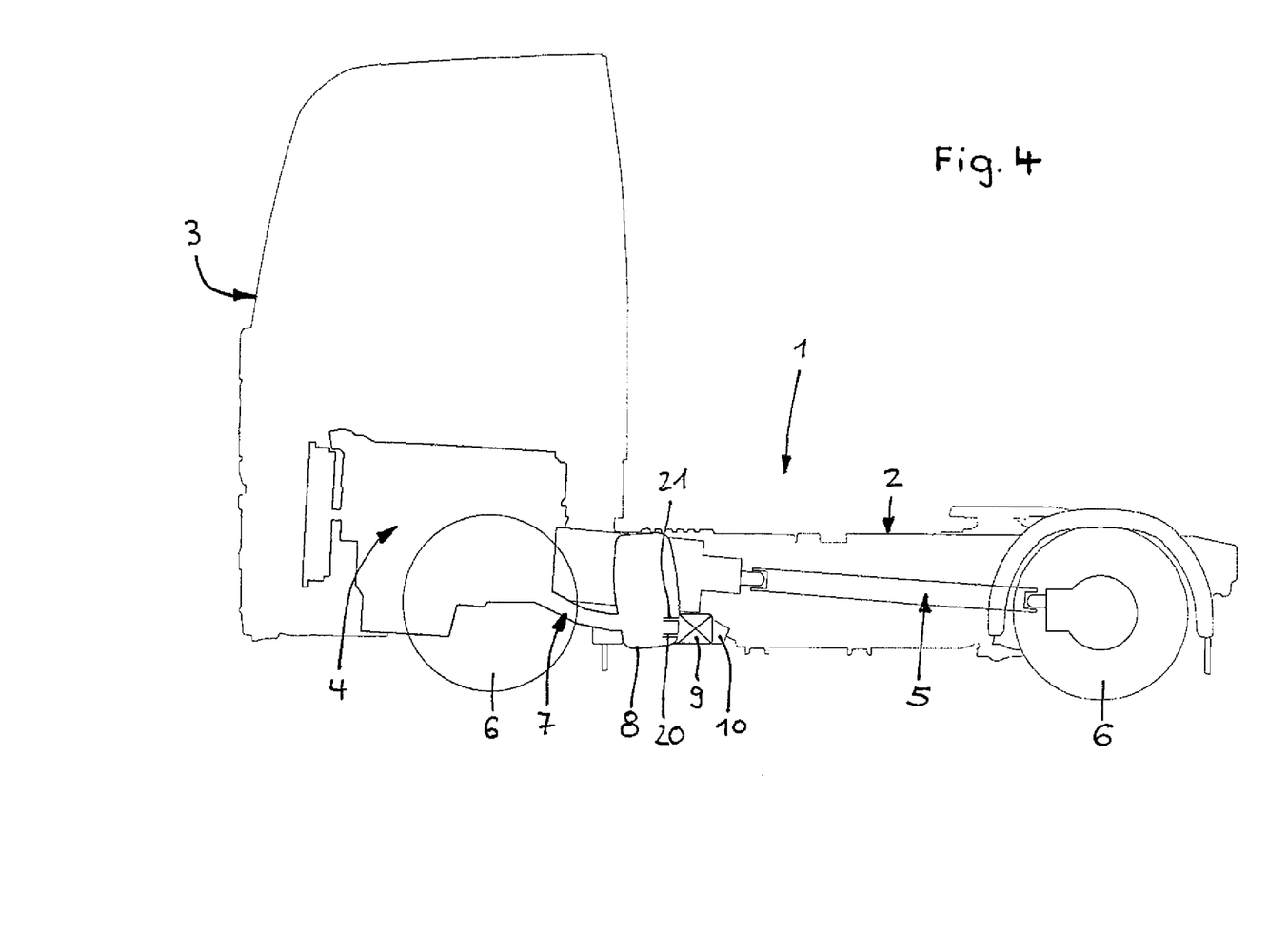
FIG. 4 shows a schematic diagram of a tractor unit with a muffler and a manner of accommodating the evaporator different from that of FIG. 1.
Figure 5:
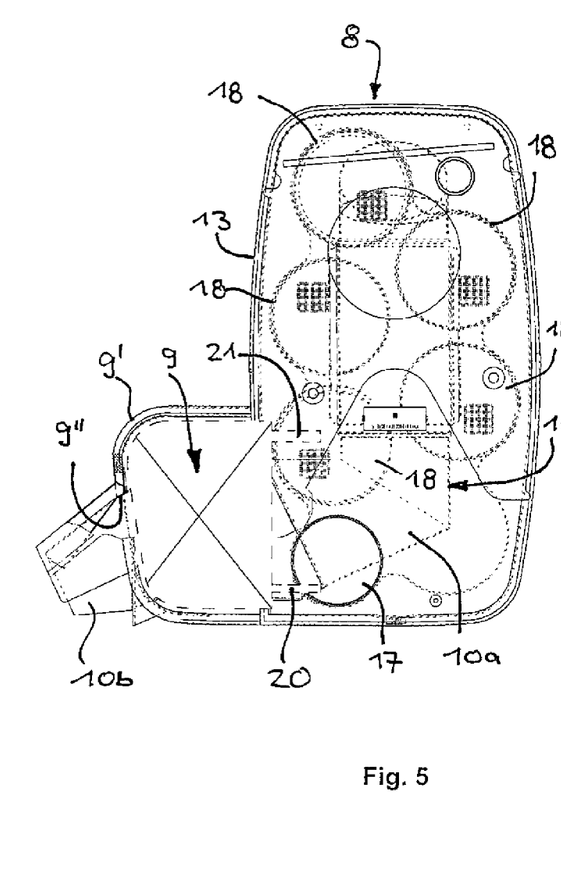
FIG. 5 shows a cross section of an embodiment of a muffler different from that used in the vehicle according to FIG. 4.
Figure 6:
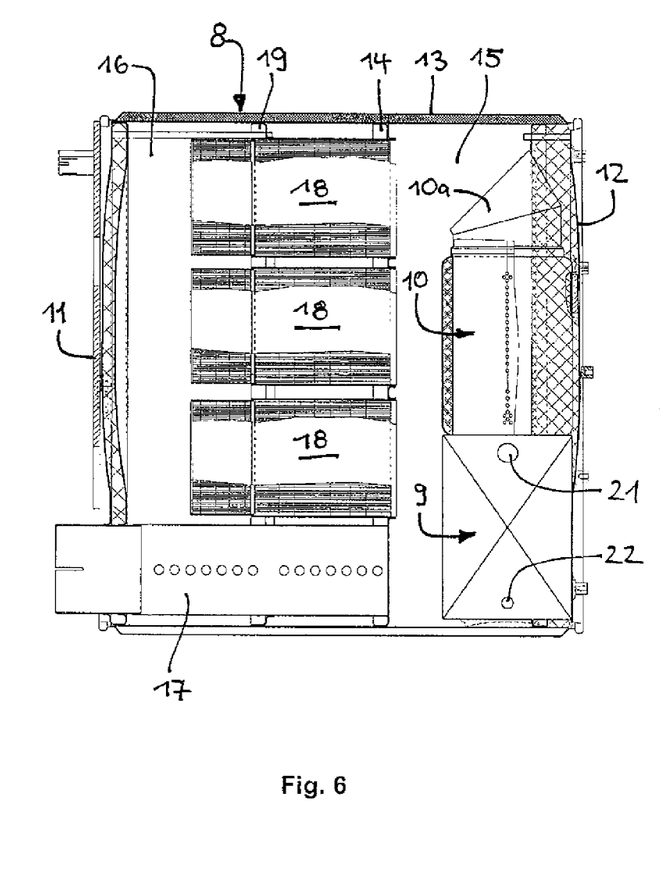
FIG. 6 shows a longitudinal cross section through the muffler of FIG. 5.
Figure 7:
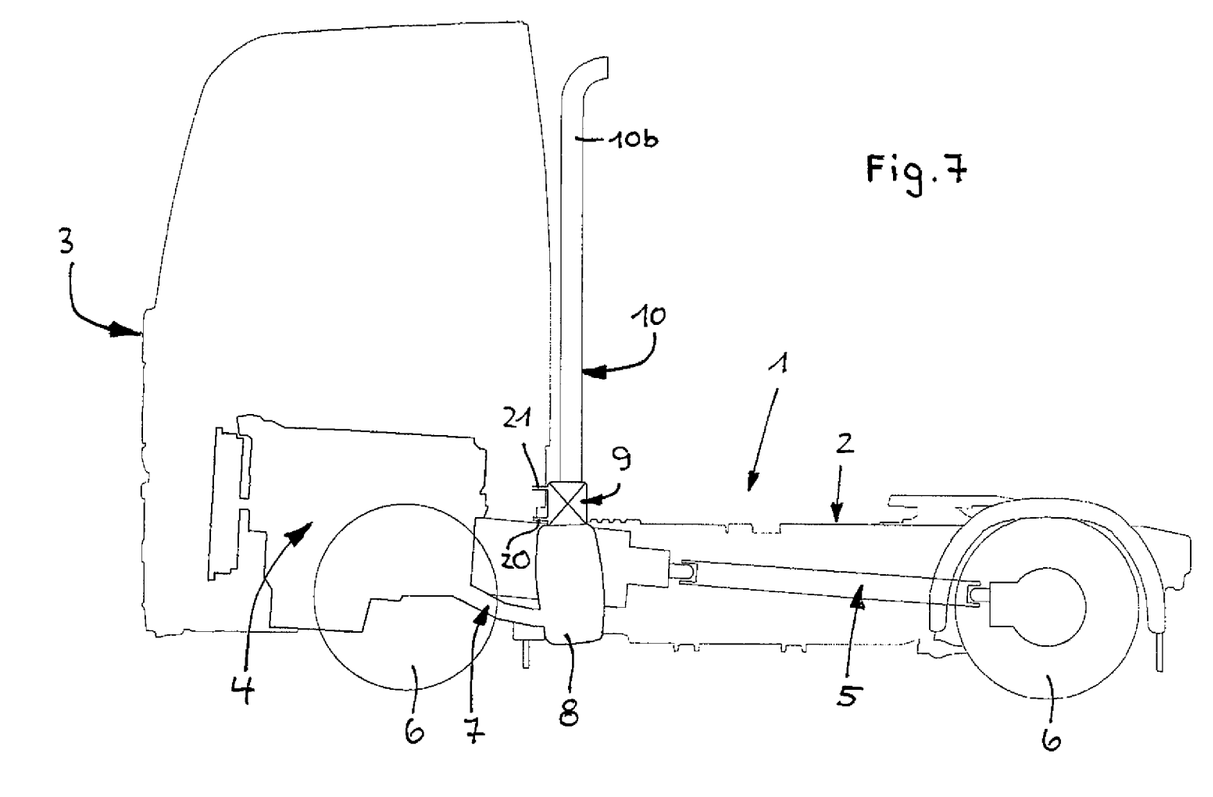
FIG. 7 shows a schematic diagram of a tractor unit with another alternative manner of accommodating an evaporator.

In the case of the vehicle according to FIG. 4, a muffler 8 is preferably used which, as can be seen in FIGS. 5 and 6, is largely the same as those of FIGS. 2 and 3, but in its embodiment the evaporator 9 is located in a different place, namely, externally at the bottom and to the side of the muffler. The same or similar parts are therefore designated in FIGS. 5 and 6 by the same reference numbers as those used in FIGS. 2 and 3. In this example—as is seen in FIG. 5—the evaporator 9 is integrated into a housing 9', which is attached externally to a lower part of the circumferential outside wall 13 of the muffler 8 near the end wall 12, which forms one of the boundaries of the exhaust space 15. The circumferential outside wall 13 of the muffler 8 has an opening in this area. The inlet section 10*a* of the tailpipe 10 located internally in the exhaust space 15, extends as far as the evaporator 9, and then, outside the muffler 8, its outlet section 10*b* proceeds from the end of the housing 9' of the evaporator 9 in the area of an outlet opening 9". In this exemplary embodiment, too, the evaporator 9 comprises a lower connection piece 20, which is connected to a feed line 22 for the liquid circulation medium, and an upper connection piece 21, which is connected to a discharge line 23 for the vapor medium. In FIG. 4, the arrangement of this evaporator 9 in the commercial vehicle 1 has again been indicated by a black field on the muffler 8.

Figure 8:
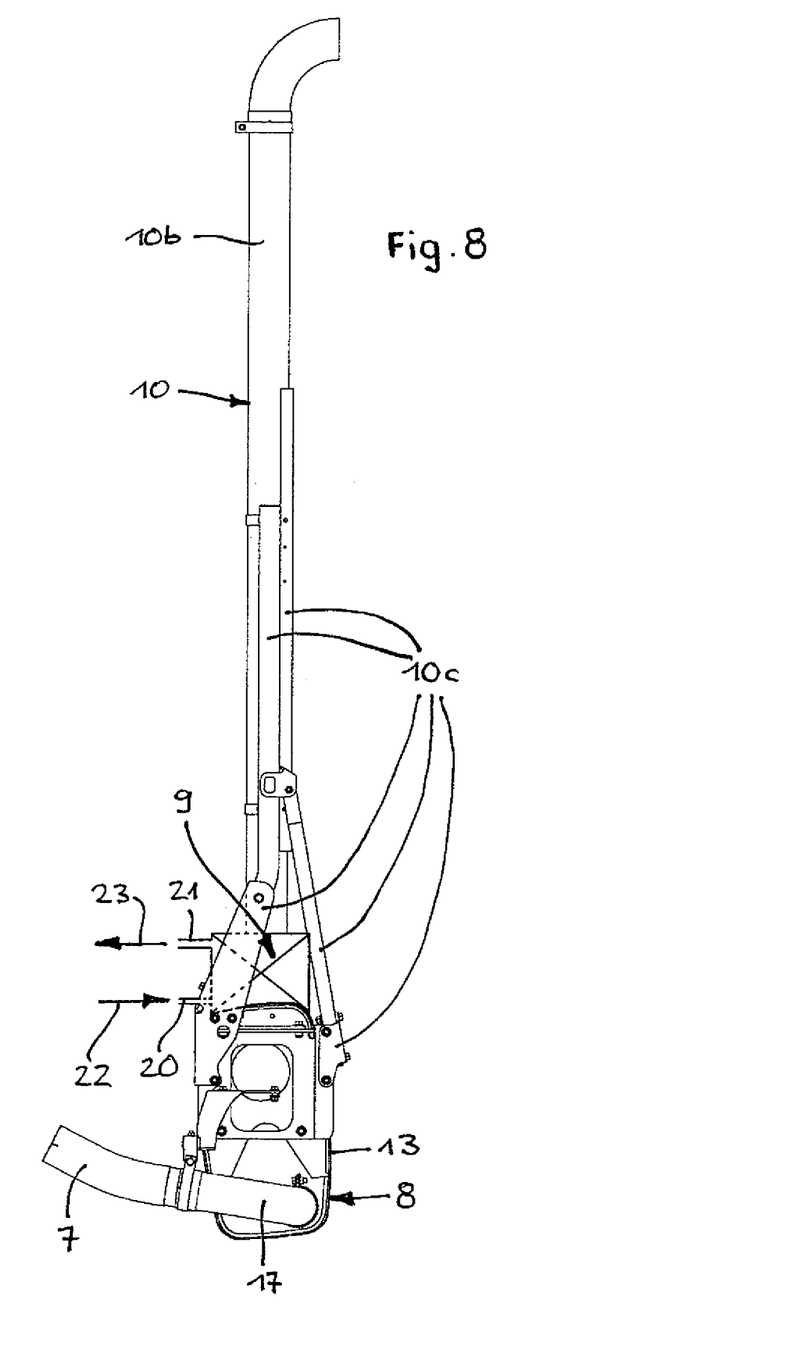
FIG. 8 shows a part of the vehicle according to FIG. 7.

In the case of the commercial vehicle according to FIG. 7, preferably again a muffler 8 similar to those of FIGS. 5 and 6 is used, but in its embodiment the evaporator 9 is installed in yet a different place, namely, externally and on top of the muffler. The parts in FIGS. 7 and 8 which are the same or similar are therefore again designated by the same reference numbers. In this example, the housing of the evaporator 9—as can be seen in FIG. 8—is attached to the top side of the circumferential outside wall 13 of the muffler 8. The circumferential outside wall 13 of the muffler 8 comprises an opening in this area. The inlet section 10*a* of the tailpipe 10, which is located inside the exhaust space 15, is guided to the evaporator 9 at a point near the end wall 12, which forms one of the boundaries of the muffler, and outside the muffler 8, the outlet section 10*b* of the tailpipe 10, which is located on the outlet side of the evaporator 9, continues vertically upward behind the driver's cab 3. This tailpipe outlet section 10*b* is stabilized in position relative to the muffler 8 by several brackets and struts 10*c*.

Figure 9:
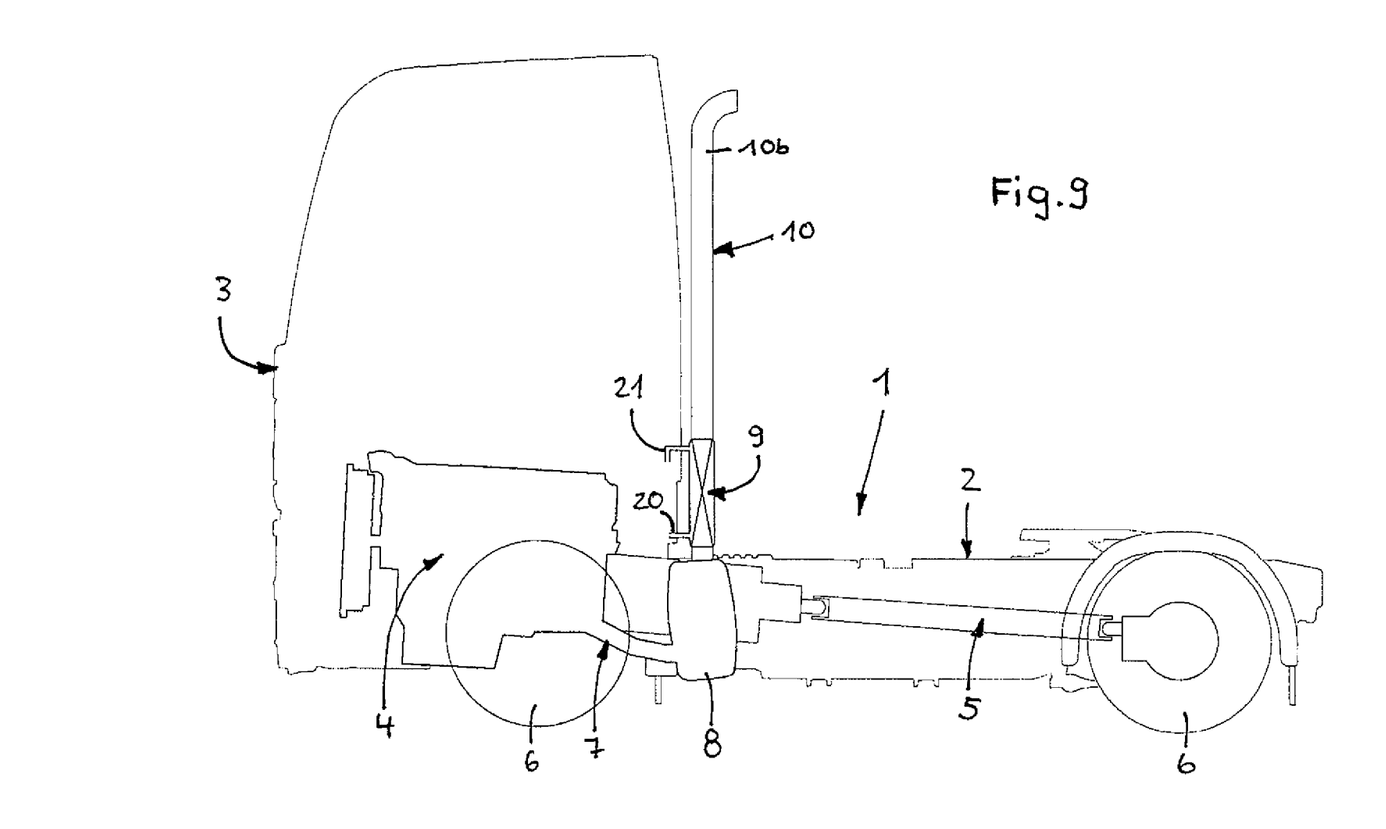
FIG. 9 shows a schematic diagram of a tractor unit with another alternative manner of accommodating an evaporator.
Figure 10:
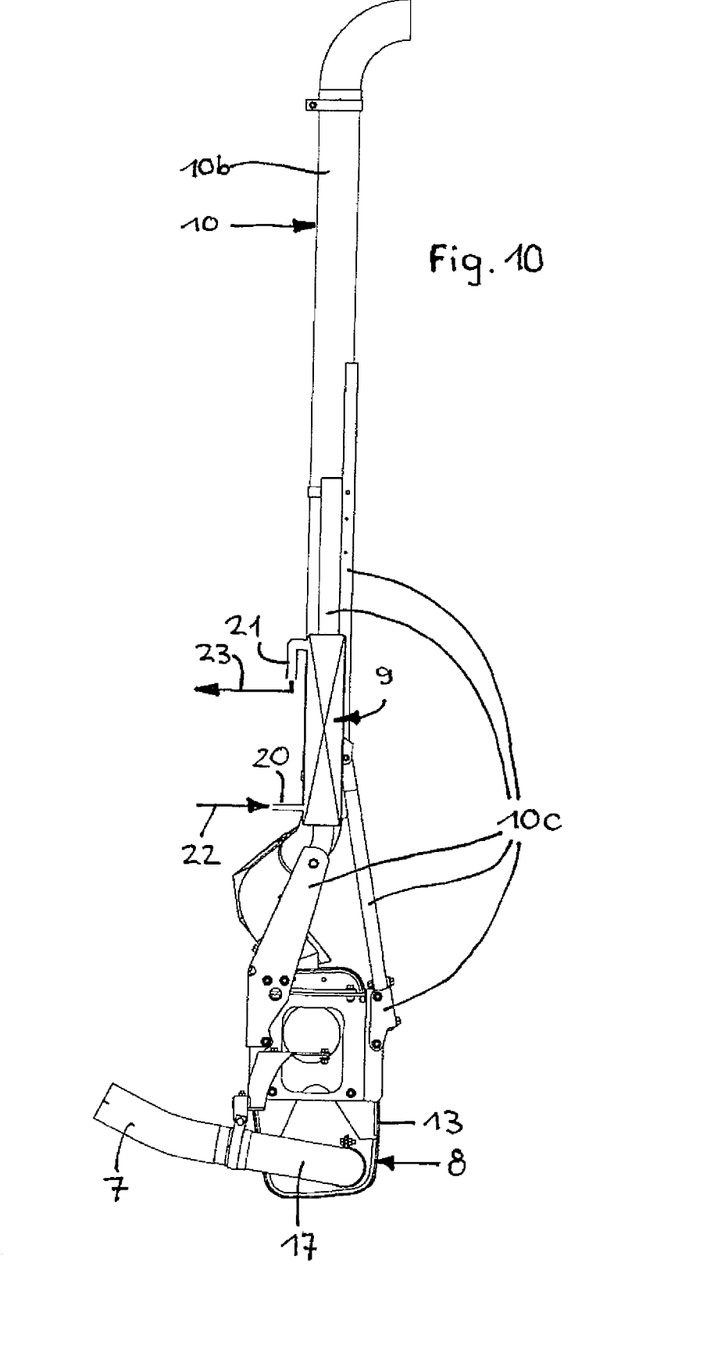
FIG. 10 shows a part of the vehicle according to FIG. 9.

In the case of the commercial vehicle 1 according to FIG. 9, a muffler 8 which is the same as or similar to that in the commercial vehicle according to FIG. 4 is used, but here the evaporator 9 is not installed on the muffler 8 but rather is integrated into the final section 10*b* of the tailpipe 10, which proceeds vertically upward behind the driver's cab 3. This final section 10*b*—as can be seen in FIG. 10—is connected to the outlet side of the muffler 8. The evaporator 9 here either is installed in this tailpipe section 10*b*, preferably adjacent to the muffler 8 or not far away from it, or partially replaces the final section 10*b* of the tailpipe. Here, too, the tailpipe 10 is stabilized in its position relative to the muffler 8 by special brackets/struts 10*c*.

In the examples according to FIGS. 7, 8, 9 and 10, the evaporator 9 comprises a lower connection piece 20, to which a feed line for the circulating liquid medium is connected, and an upper connection piece 21, to which a discharge line 23 for the circulating vapor medium is connected. The position of this evaporator 9 on the commercial vehicle according to FIG. 9 has again been indicated by a black field.

Figure 11:
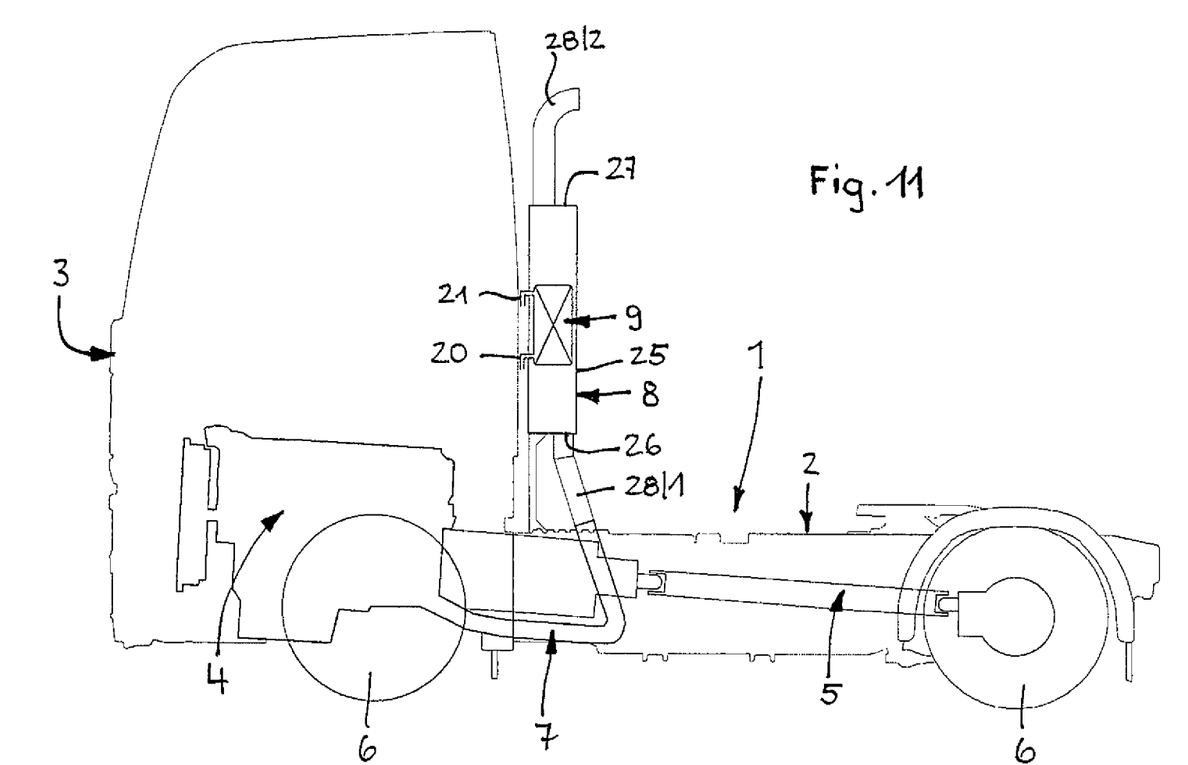
FIG. 11 shows a schematic diagram of a tractor unit with another alternative manner of accommodating a muffler and an evaporator.
Figure 12:
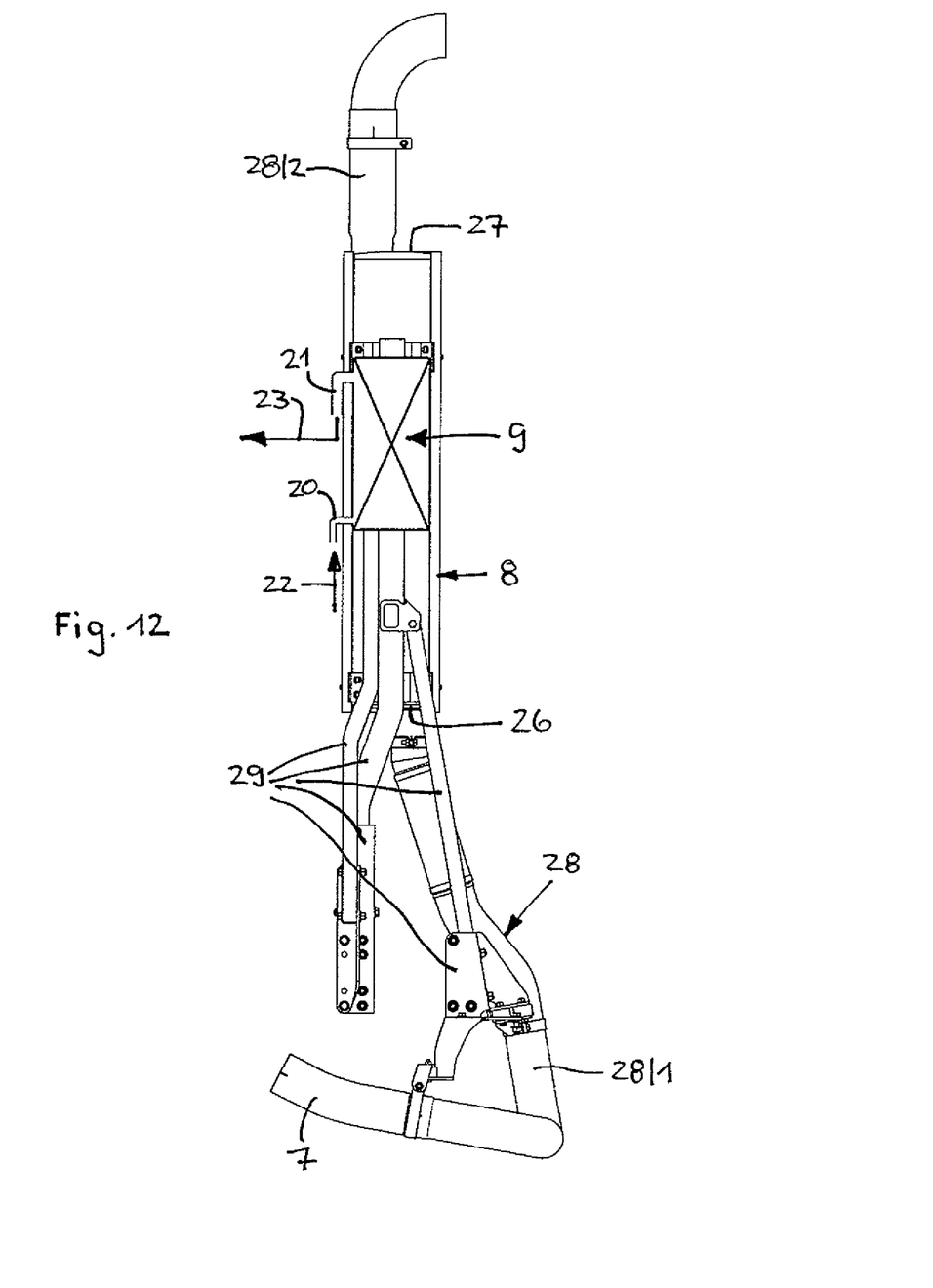
FIG. 12 shows a part of the vehicle according to FIG. 11.
Figure 13:
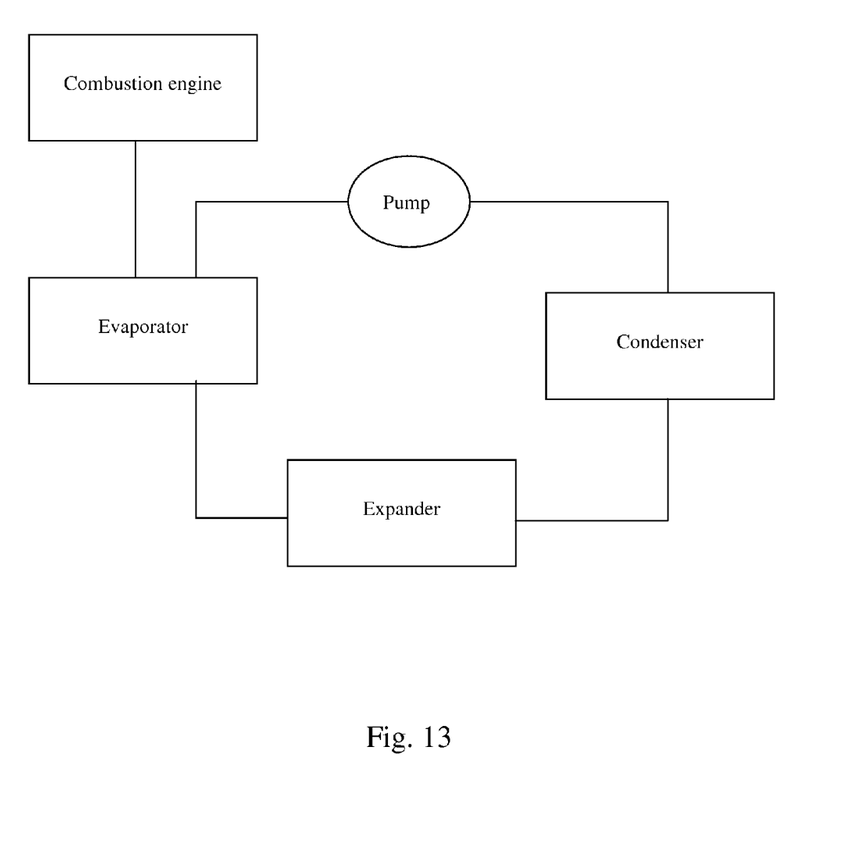
FIG. 13 shows a schematic diagram of a medium containing circuit including a pump, an evaporator, an expander and a condenser.
Figure 14:
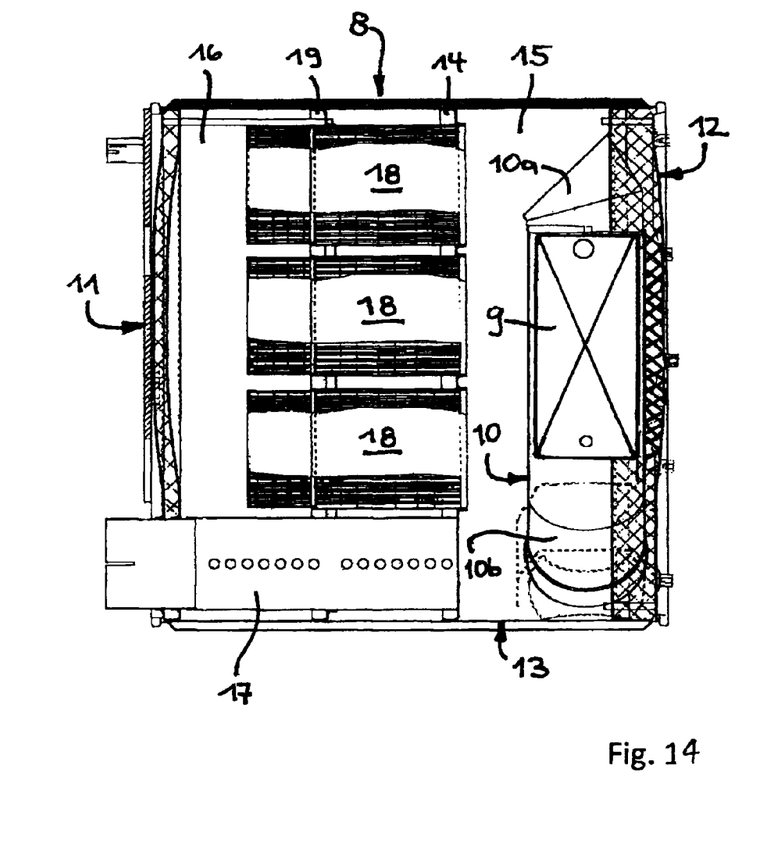
FIG. 14 shows the muffler of FIG. 2 with the evaporator installed in the tail pipe within the muffler.
Figure 15:
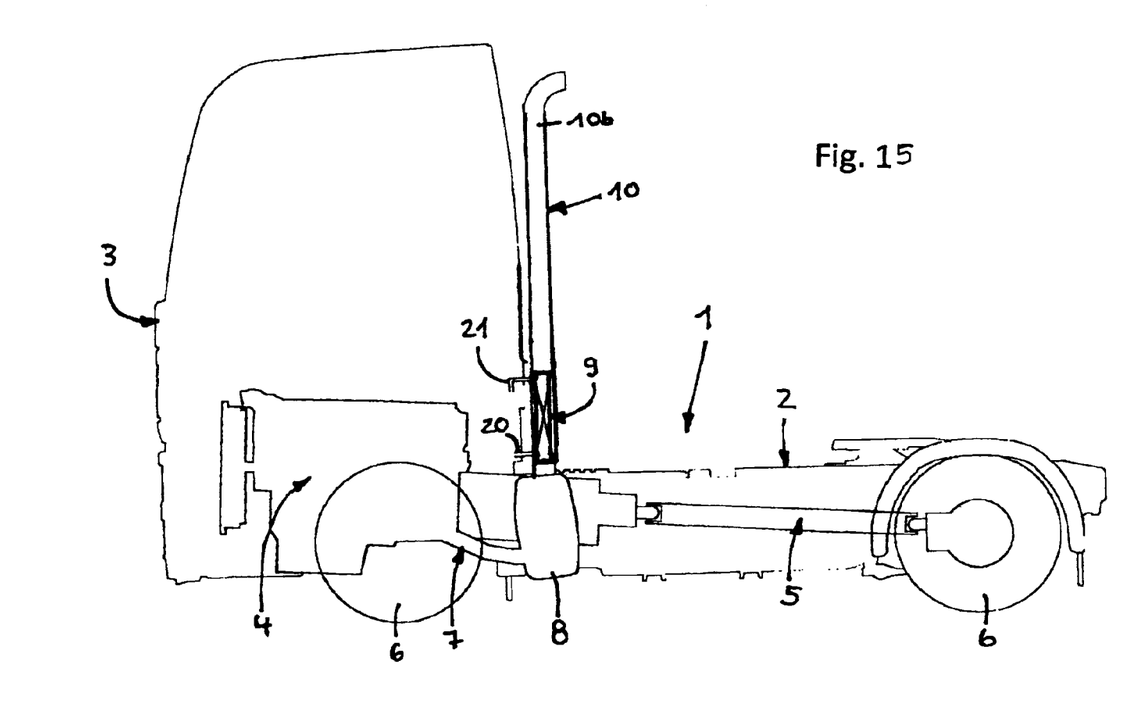
FIG. 15 shows the muffler of FIG. 9 with the evaporator installed in the tail pipe.
Figure 16:
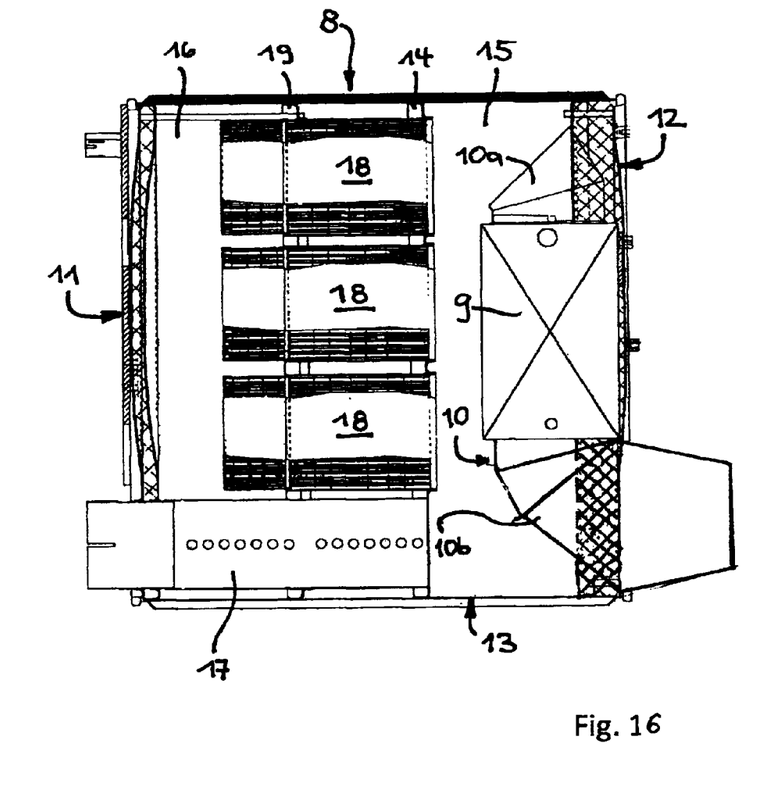
FIG. 16 shows the muffler of FIG. 2 with the tailpipe extending out of the muffler through the rear-end wall.
Figure 17:
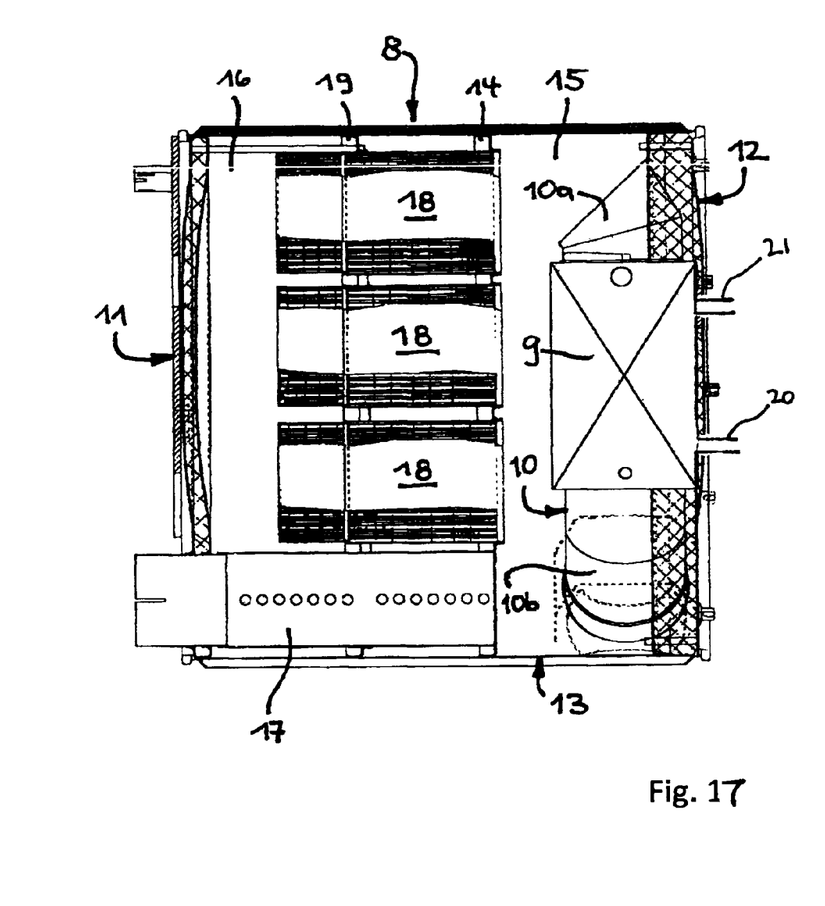
FIG. 17 shows the muffler of FIG. 2 with connecting pieces guided out of the muffler through the rear-end wall.

In the case of the commercial vehicle 1 according to FIG. 11, a muffler 8 different from that of the previously described embodiments is used. Here the muffler 8 is formed by a hollow cylinder 25, arranged essentially vertically behind the driver's cab 3. This cylinder is closed off at the top and bottom by walls 26, 27. This muffler 8—as can be seen in FIG. 12—is connected by way of a wall 26 to the feed-side section 28/1 and by way of a wall 27 to the discharge-side section 28/2 of the exhaust pipe 28, which extends vertically upward behind the driver's cab 3. The catalysts and/or filters (not shown) serving to treat the exhaust gas and the evaporator 9 are integrated into this muffler 8. The evaporator 9 again comprises a lower connection piece 20 and an upper connection piece 21, which are guided to the outside through the hollow cylindrical wall 25 of the muffler 8 and connected externally at 20 to the feed line 22 for the circulating liquid medium and at 21 to the discharge line 23 for the circulating vapor medium. In this example, brackets and struts 29 hold the exhaust pipe 28 with the muffler 8 in position relative to the feed-side part of the exhaust gas system 7 and relative to the chassis 2. In FIG. 11, the position of the evaporator 9 on the subject commercial vehicle 1 is again indicated by a black field on the muffler 8.

The evaporator 9 is designed and constructed in such a way that it is suitable for converting the liquid medium circulating through it, i.e., the medium supplied via the feed line 22, into the aggregate vapor state by the use of the residual heat of the exhaust gas flowing by. It is possible but not mandatory for the liquid medium being supplied to have already been preheated as the result of a preceding heat exchange in the heat recovery circuit. The circulating medium which has been converted into its vapor state is supplied via the discharge line 23 in the heat recovery circuit to an expander, which converts the energy of the vapor into mechanical energy, which boosts the drive power at the crankshaft of the internal combustion engine 4 as supplemental drive power.

The invention is not limited by the embodiments described above which are presented as examples only but can be modified in various ways within the scope of protection defined by the appended patent claims.

We claim:

1. A commercial vehicle including a driver's cab, an internal combustion engine (4), an exhaust gas system (7), a muffler (8) and a tail pipe (10); and a heat recovery system with a medium-containing circuit including at least one pump, an expander and a condenser, and wherein the waste heat of one of the internal combustion engine (4), hot engine assemblies and hot working media is convertable into useful power-boosting energy; said commercial vehicle comprising an evaporator (9) in the medium-containing circuit of the heat recovery system, said evaporator being one of
   integrated into the muffler (8) by one of being installed into the tailpipe (10) within the muffler and partially replacing the tailpipe (10) within the muffler (8);
   attached externally to the muffler (8) and to an end section (10b) of the tailpipe (10) and within the muffler to an inlet section of the tailpipe;
   integrated into the tailpipe (10) by one of being installed in the tailpipe (10) and partially replacing the tailpipe (10); and
   integrated into a muffler (8) by being installed in an exhaust pipe (28) extending vertically behind the driver's cab (3).

2. A commercial vehicle of claim 1, wherein said muffler (8) comprises:
   a front-end wall (11), a rear-end wall (12), a circumferential outside wall (13) connecting said front-end wall and said rear-end wall;
   an intake space (16), and an exhaust space (15);
   an intermediate wall (14) separating said intake space from said exhaust space (15), an intake pipe (17) leading into said intake space (16);
   said tailpipe (10) for holding said evaporator (9) having an intake section (10a) disposed in said exhaust space (15) upstream of said evaporator (9) and said end section (10b) disposed downstream of said evaporator (9) and extending out of said muffler through one of said rear-end wall (12) forming a boundary of said exhaust space and through said circumferential outside wall (13).

3. The commercial vehicle of claim 2, wherein said evaporator (9) is attached to an inside surface of said rear-end wall (12) of said muffler (8) forming a boundary of said exhaust space (15).

4. The commercial vehicle of claim 2, wherein the evaporator (9) additionally comprises a first connection piece (20) for supplying circulating liquid medium and a second connection piece (21) for discharging circulating liquid medium in the vapor state, said first and second connection pieces being guided out of said muffler (8) through one of said rear-end wall (12) and said circumferential outside wall (13) for connection to a feed line (22) for said circulating liquid medium and a discharge line (23) for the circulating medium in the vapor state.

5. The commercial vehicle of claim 1, wherein said evaporator (9) is attached externally to said muffler (8); and wherein said the muffler (8) comprises a front-end wall (11), a rear-end wall (12), and a circumferential outside wall (13) connecting said front-end wall (11) and said rear-end wall (12);
   an intake pipe (17); and
   said tailpipe (10), in an area of one of said end walls (11, 12), being guided out of said muffler (8) through one of said end-walls and said circumferential outside wall (13); said tailpipe further extending at the outside of said evaporator.

6. The commercial vehicle of claim 1, wherein said evaporator (9) is integrated into a section (10b) of said tailpipe adjacent said muffler (8) by one of being installed in said tailpipe section (10b) and partially replacing said tailpipe section (10b); said muffler comprising a front-end wall (11), a rear-end wall (12), and a circumferential outside wall (13) connecting said front-end wall and said rear-end wall; an intake pipe (17); and a tailpipe (10) which, in an area of an end wall (11, 12), is guided out of said muffler through one of an end wall and said circumferential outside wall (13); said tailpipe further extending vertically upward behind said driver's cab.

7. The commercial vehicle of claim 5, wherein said evaporator comprises a connection piece (20) for connection to a supply line (22) for circulating liquid medium and a connection piece (21) for connection to a discharge line (23) for the circulating medium in the vapor state.

8. The commercial vehicle of claim 1, wherein said muffler comprises a substantially vertically arranged hollow cylinder (25) extending behind the driver's cab, said cylinder having a top wall (27) and a bottom wall (26); said tail pipe extending vertically upward behind the driver's cab and comprising a feed-side section (28/1) connected to said bottom wall (26) of said muffler and a discharge-side section connected to said top wall of said muffler, said evaporator (9) being integrated into said muffler; and wherein said evaporator further comprises a first connection piece (20) for the supply of a circulating liquid medium and a second connection piece (21) for the discharge from said evaporator (9) of the circulating medium in the vapor state, said first and second connection pieces being guided laterally out through said hollow cylindrical wall (25) of said muffler (8), said first connection piece (20) being connected externally to a supply line for the circulating liquid medium and said second connection piece (21) being connected to a discharge line (23) for the circulating medium in the vapor state.

9. The commercial vehicle of claim 1, wherein the circulating medium is supplied to said evaporator in the liquid state, the circulating medium discharge from said evaporator is in the vapor state and fed to the expander for converting the energy of the vapor into mechanical energy for exerting a driving action on a crankshaft of the internal combustion engine as additional drive power.

* * * * *